(12) United States Patent
Karlsson et al.

(10) Patent No.: US 6,202,654 B1
(45) Date of Patent: *Mar. 20, 2001

(54) CLEANING SYSTEM

(75) Inventors: Patrik Karlsson, Stallarholmen; Peter Lindquist, Nyköping, both of (SE)

(73) Assignee: Astra Aktiebolag, Sodertalje (SE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/549,849

(22) PCT Filed: Oct. 20, 1995

(86) PCT No.: PCT/SE95/01241

§ 371 Date: Nov. 16, 1995

§ 102(e) Date: Nov. 16, 1995

(87) PCT Pub. No.: WO96/13343

PCT Pub. Date: May 9, 1996

(30) Foreign Application Priority Data

Oct. 28, 1994 (SE) .................................... 9403698

(51) Int. Cl.$^7$ .................................................. B08B 9/093
(52) U.S. Cl. .................. 134/22.18; 134/22.1; 134/10; 134/22.12
(58) Field of Search .................. 134/186, 104, 134/109–111, 22.1, 22.12, 22.18, 10

(56) References Cited

U.S. PATENT DOCUMENTS

| | | | |
|---|---|---|---|
| 1,635,115 | * 7/1927 | Deutsch et al. | 134/111 |
| 2,312,091 | * 2/1943 | Gray | 134/111 |
| 4,379,467 | 4/1983 | Purr . | |
| 5,000,206 | 3/1991 | Kramer et al. | 134/34 |

FOREIGN PATENT DOCUMENTS

| | | | |
|---|---|---|---|
| 392926B | * 7/1991 | (AT) . | |
| 392926 | * 10/1991 | (AT) . | |
| 1164416 | * 9/1969 | (DE) . | |
| 1611113 | * 12/1970 | (DE) . | |
| 3918285 | * 1/1990 | (DE) . | |
| 1164416 | 9/1969 | (GB) . | |
| 51 150165 | * 12/1976 | (JP) . | |
| 346695 | * 7/1972 | (SE) . | |
| 8809226 | * 12/1988 | (WO) . | |
| 8910214 | * 11/1989 | (WO) . | |

* cited by examiner

Primary Examiner—Laurie Scheiner
Assistant Examiner—J. S. Parkin
(74) Attorney, Agent, or Firm—White & Case LLP (57) ABSTRACT

The present invention relates to a method for cleaning a container (30) and conduits (32, 33, 36) associated with said container by adding a cleaning solvent to the container and circulating said solvent through said conduits back to said container. In accordance with the invention the cleaning solvent additionally is forced intermittently through a filter unit (1) containing an absorbent material, preferably active carbon (3), and then is allowed to flow through said conduits to said container, said container and conduits thus intermittently being flushed with clean solvent. The container may be a reaction vessel for chemical processes.

6 Claims, 6 Drawing Sheets

CLEANING SYSTEM

TECHNICAL FIELD OF THE INVENTION

The present invention relates to a method for cleaning a container and conduits associated with said container by adding a cleaning solvent to the container and circulating said solvent through said conduits back to said container. The container may be a reaction vessel for chemical processes.

The invention also relates to an apparatus for use in the above method, and a filter unit forming part of such an apparatus.

BACKGROUND TO THE INVENTION

Reactors, i.e. large vessels for chemical processes often performed under elevated temperatures and elevated pressures, have to be cleaned periodically during use or after use to remove any contaminants or other matter disturbing the chemical process carried out in the reactor or influencing the yield. The cleaning is particularly important when the reactor is to be used for another process. Said cleaning is normally made in different steps, such as a first rough cleaning of the reactor by means of high pressure liquid jet cleaning, if necessary complemented by mechanical cleaning, followed by solvent cleaning in which a suitable solvent (chosen in dependence of the contaminants to be removed) is circulated through the vessel and through the conduits and manifolds connected thereto. One typical solvent is for instance ethanol.

In one commonly used method, which for instance may be termed "forced circulation", the solvent simply is pumped through the system in such a way that the liquid comes into contact with all contaminated parts of the system. After some time the solvent will be contaminated to a degree entailing that a continued circulation of the solvent will just re-contaminate the reactor system and the solvent consequently must be replaced by new, pure solvent.

In another commonly used method the solvent may be added to the reactor and brought to the boiling point, the solvent thus at least partly being vaporized. The vaporized solvent is led to a cooler in which it is condensed, preferably in the cooler normally being associated with the reactor, and the condensed solvent is allowed to flow in a direction which is opposite to the normal direction of flow in the reactor system and the conduits associated therewith in order to dissolve and remove any contaminants. This procedure is sometimes termed "reflux" and will be so called in the discussions below.

Since the contaminants also may be volatile, at least to some extent, the amount of contaminant following the vaporized solvent back into the reactor system, and to some extent re-contaminating the reactor system, will increase in proportion to the increase of the contaminants in the solvent. At a certain point, the cleaning recontamination will reach an equilibrium and the contaminated solvent consequently will have to be drawn off and replaced with new, pure solvent.

These above solvent-cleaning procedures are repeated until the required degree of decontamination has been obtained. The degree of decontamination necessary for pharmaceutical purposes may for instance be ascertained by UV spectral analysis within a specific wave-length range for a specific solvent, by filter tests and by visual control of the cleaning solvent, the amount of contaminants in the circulating solvent indicating the degree of remaining contamination of the reactor system.

These processes are however very time-consuming and very wasteful in regard of the cleaning solvent, since the solvent has to be replaced several times before the solvent has reached a purity level indicating that the rector and the manifold associated therewith has a degree of cleanness which is sufficient for the purposes of the chemical processes to be carried out in the reactor system. It is of course also difficult and expensive to recycle or otherwise take care of such large amounts of contaminated solvent, not least from an environmental view. The additional costs arising as a consequence of the long delay before the reactor system can be used again are high.

DE 3918285-A1 Elastogran Polyurethane GmbH) discloses a process and apparatus for rinsing or cleaning of mixing apparatuses for multi-component plastics, especially polyurethane. The rinsing agent can be fed back into the rinsing agent cycle after it has been cleaned in a filter. The rinsing agent is simply drained off into a collecting vessel, and recycled manually as required.

U.S. Pat. No. 2312091 (Gray/Gray Company, Inc.) discloses an apparatus for cleaning automobile engines. Solvent is circulated internally throughout the engine, where it collects varnish, sludge, gum deposits, carbon dirt and the like. After the engine is stopped again, the dirt-laden solvent is pumped out and gravitationally filters through one or more filter units, which clean the solvent. The cleaned solvent collects in a reservoir, and is again recycled manually as required.

Both of these documents are concerned with cleaning apparatuses in which the solvent is cleaned after the cleaning process has occurred. Thus, if cleaning is to be continued, considerable delay is caused by:

stopping the cleaning process, draining off the solvent, filtering it, feeding it back into the reactor system, and starting the cleaning process again.

Elsewhere, for example in U.S. Pat. No. 1635115 (Deutsch et aL /Deutsch), cleaning systems have been used in which a cleaning liquid is constantly led through a filter as it is circulated. This has the disadvantage that delay is caused by constantly:

leading the solvent to the filter, filtering it, and feeding it back into the reactor system.

In the event of the filter becoming blocked, the cleaning process would stop altogether, as circulation is no longer possible.

DISCLOSURE OF THE INVENTION

We have now found that the above disadvantages may be eliminated by using a method of the kind described above in which the cleaning solvent additionally may be forced intermittently through a filter unit containing a suitable absorbent material and allowed to flow through conduits to a container, said container and conduits thus intermittently being flushed with pure solvent.

Thus, according to the present invention there is provided a method for cleaning a container and conduits associated with said container by adding a cleaning solvent to the container and circulating said solvent through said conduits back to said container, characterized in that the cleaning solvent additionally may be forced intermittently through a filter unit containing a suitable absorbent and allowed to flow through said conduits to said container, said container and conduits thus intermittently being flushed with purified solvent.

Such a method allows both the consumption of cleaning solvent and the time needed for the cleaning to be minimized, and also minimizes the environmental problems associated with large amounts of contaminated solvents.

It is advantageous to have the solvent come into contact with as many of the contaminated surfaces as may reasonably be achieved. This can be done by circulating the solvent by heating the solvent to the boiling point and conducting the resulting vaporized solvent to a cooling unit located above the container and permitting the condensed solvent to flow through the conduits back into the container. This way, all the contaminants are gradually dispersed in the solvent and can be filtered out again.

A pump may be used to ensure that the solvent is circulated in such a way that the solvent comes into contact with all contaminated surfaces.

The passage of solvent through the filter is preferably done in a controlled fashion. This may be achieved by orienting the filter unit in such a way that the direction of flow in use is vertical and upwards.

An absorbent material should be chosen that effectively leaves the solvent in a purified form, though it need not be left entirely free of contaminants. A suitable absorbent material in the filter unit is granulated, active carbon.

The method may be used for cleaning any apparatus in which a container is associated with conduits, such as chemical process equipment. It is ideally suited for cleaning reactor vessels for chemical processes. It may also be adapted for use with, for example, glove boxes.

According to a further aspect of the present invention, there is provided an apparatus for use in a method of the type specified.

The apparatus may be adjustable so that a portion of the cleaning solvent may be forced through the filter unit at the same time as the remainder of the solvent by-passes the filter vessel so as to return to the container. A particularly versatile system allows all the solvent to be forced through the filter unit, all of it to by-pass the filter unit, or portions of the solvent to follow both routes, as desired.

A specified filter unit has an optimum flow rate for solvent through it. Thus, ideally the flow rate through the filter unit will be capable of being set to a predetermined value.

One or more particle filters may be provided as well as the main filter unit, the filters being connected in series with a pump for connection to the container. This ensures that the main filter unit does not become quickly clogged with large particles.

According to a still further aspect of the present invention, there is provided a filter unit for use in a method or apparatus of the type specified, characterized in that the filter unit comprises a tubular housing for the absorbent material, an upper end part containing a plunger with a filter for holding and compressing the absorbent material and a lower end part with a filter for holding the absorbent material. One of the end parts, preferably the upper one, will be removable to allow the absorbent material to be replaced. The absorbent material can therefore be discarded from time to time, minimizing the possibility of cross-contamination.

The absorbent material should ideally be sufficiently compressed so that it cannot move around. This prevents the relatively contaminated lower end from mixing with the relatively clean upper end in use.

It is possible that the compression of the absorbent material will change as the material settles. This can be prevented by agitating the material, and at the same time applying a sustainable torque.

An elegant way of compressing the absorbent material is by using a cam mechanism comprising a tightening nut and a locking nut mounted on a threaded bar, the nuts being separated by a slitted bracket, whereby one element selected from the bar and bracket is mounted on the plunger and the other is mounted on the housing.

DETAILED DESCRIPTION OF A PREFERRED EMBODIMENT OF THE INVENTION

Figure 1:
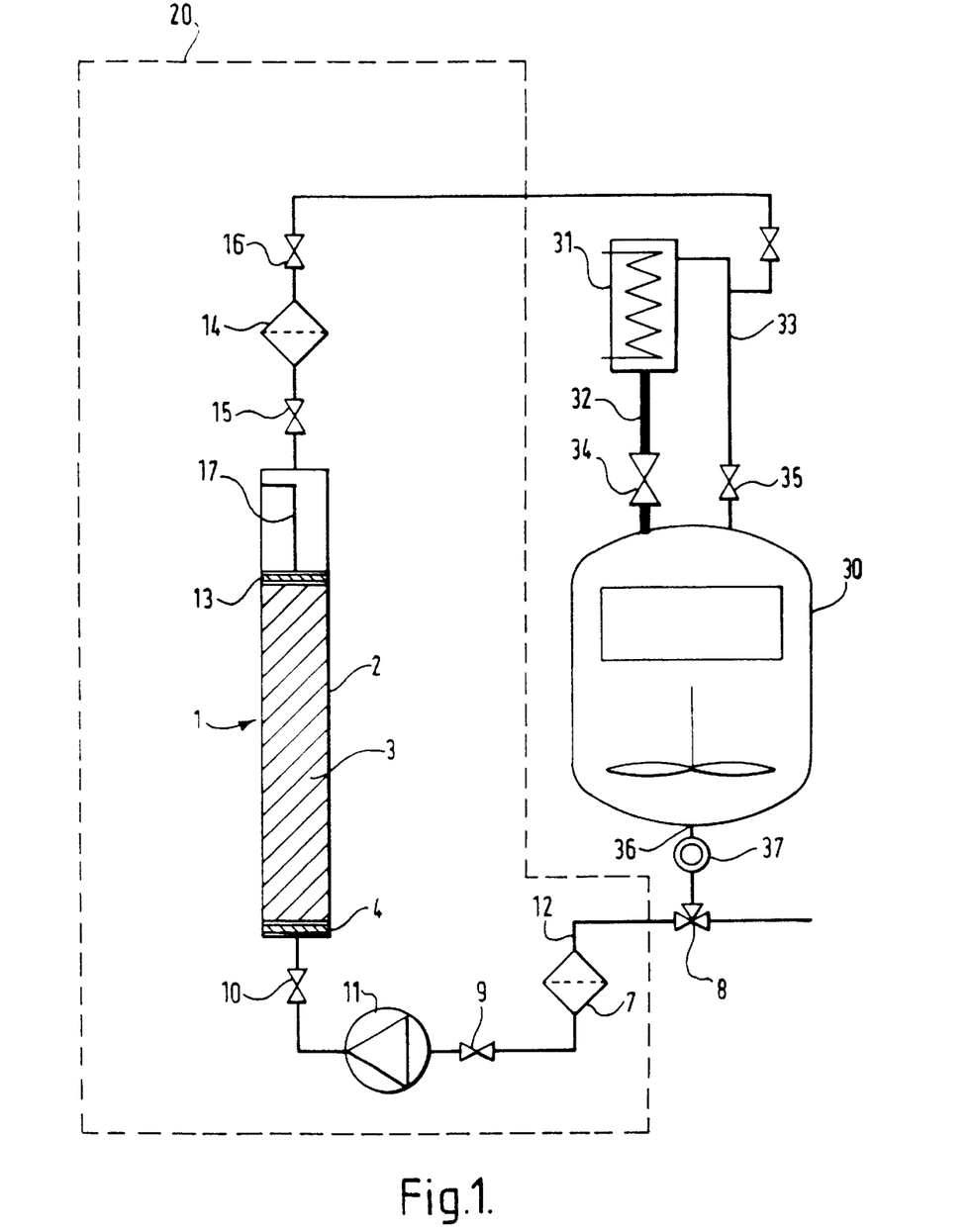
FIG. 1 is a schematic view of a conventional reactor system into which a filter unit according to the invention has been connected.

A schematic illustration of a filter unit 1 according to the invention, connected to a container comprising a conventional reactor vessel 30 with a conventional cooling unit 31, is given in FIG. 1. The cooling unit 31 is connected in series to the reactor vessel 30 by means of conduits 32 and 33 provided with valves 34 and 35. The bottom end of the reactor is provided with a sight glass 37 as is conventional in the art. This sight glass may be used at the visual control of the purity of the solvent in connection with the standard tests listed above. In this embodiment, the reactor system is intended to be cleaned by the "reflux" method. There are of course also other conduits in the system which are cleaned apart from the conduits 32 and 33, but these other conduits are not illustrated.

The parts in FIG. 1 relating to the invention are framed by means of the dashed line 20.

The filter unit 1 comprises a tubular housing 2 filled with an absorbent material which in this particular case is granulated active carbon 3. The filter unit is oriented vertically in use. The carbon is held in the housing 2 by means of a fixed particle filter 4 at the lower end of the housing and by a movable and lockable plunger 17 provided with a filter 13 at the upper end of the housing. The filters 4 and 13 have a mesh size which is small enough to keep the carbon granules from passing through the filters.

The plunger 17 can be moved into the housing 2 in order to compress the granulated carbon to an extent sufficient to prevent the granules from moving when the solvent to be cleaned in the filter unit 1 is forced through the active carbon 3 and to prevent the formation of open channels through the carbon granules.

Although the plunger 17 is illustrated as being located at the upper end of the filter unit 1, the filter 4 and the plunger 17 of course may be exchanged with each other without changing the function of the filter unit.

Starting from the lower outlet 36 of the reactor vessel, an optional first particle filter 7 is connected in series with a pump 11 and the lower end of the filter unit 1 via valves 8, 9, 10 by means of a conduit 12. Whether a first particle filter 7 actually is used or not depends on the risk for the presence of larger particles in the contaminated solvent which may block the filter unit 1.

The pump 11 is a standard, commercially available high pressure pump being capable of handling boiling liquids together with vapours thereof, for instance a pump of the type APV Rosista centrifugal pump, manufactured and sold by APV Sweden AB. The pump should be capable of delivering a pressure sufficient to force the liquid through the active carbon 3 in the filter unit 1. The particle filter 13 at the downstream end of the filter unit 1 consequently has to be designed able to withstand the pressure from the liquid on the active carbon and the pressure being a result of the compression of the carbon granules whereas the particle filter 4 at the upstream end of the filter unit 1 has to be designed to withstand the pressure from the compression of the carbon granules only. The upper end of the filter unit 1 is connected in to the cooler 31 in series with a second particle filter 14 and valves 15, 16 by means of a conduit. The function of the second particle filter 14 is to ensure that any particles that accidentally may pass the filter net in the plunger are taken care of.

The carbon granules used in the preferred embodiment may be "Merck 2514" or "Chemviron carbon type F200", which both are commercially available. The size of the granules may be 1.5–2.5 mm.

The size, the hardness and the compressibility of the carbon granules as well as the compression force on the granules is however generally determined by the capacity of the pump and the desired flow through the filter unit.

Some cleaning solvents that may be used in the method according to the invention are methanol, ethanol, water, acetone, toluene, methyl isobutyl ketone, isopropyl alcohol, ethyl acetate or methylene chloride used at temperatures varying from about 10–20° C. to the respective boiling point.

As indicated above, the cleaning process is normally started with a rough cleaning by means of high pressure liquid jet cleaning. A sufficient amount of solvent is then added to the reactor vessel and circulated through the system by the "reflux" method described above (or, of course, alternatively by the "forced circulation" method).

As soon as it is deemed that the solvent has been contaminated to a degree at which the reactor system will be re-contaminated again, the outlet 36 of the reactor vessel 30 is connected to the pump 11 and the boiling, contaminated liquid is pumped through the filter unit 1. This will of course be before the above-mentioned cleaning/recontamination equilibrium is reached.

Both the dissolved contaminants and the small size contaminating particles in the cleaning solvent will thus be absorbed in the granular active carbon. The absorption initially takes place at the lower end of the filter unit and gradually moves upwardly at the same rate as the saturation of the active carbon with contaminants. As long as the saturation front has not approached the upper end of the filter unit, the filtered, pure solvent will leave the filter unit through pure, uncontaminated active carbon and then flow to the cooler unit and down to the reactor vessel. The reactor system thus will be flushed by pure solvent since the solvent is forced through the filter unit, the contaminant thus being effectively removed.

The size or length of the filter unit and the amount of active carbon contained therein may be adapted to the size of the reactor system and to the amount of cleaning solvent which is necessary, so that most of the active carbon has absorbed contaminants when the reactor system has reached the desired degree of cleanness.

Alternatively, the flow through the filter unit may be varied by adjusting the valve 16 so that the optimal flow rate for a particular filter unit is achieved. The solvent may be permitted to flow through the filter unit at the same time as cleaning of the conduits 32 and 33 occurs, by leaving all valves partly open. The system is highly versatile, as either all or none of the solvent may pass through the filter unit, or some may pass through the filter unit and some by-pass it, through judicious adjustment of the various valves.

The solvent then can be recycled or, possibly, used again without any pretreatment. The amount of solvent used is limited to the first amount added to the reactor vessel.

Two or more filters may be included, each with their own valves, to permit further versatility of the system.

The active carbon in the filter unit containing the contaminants can be easily disposed of The filter unit with pump, particle filters and conduits may advantageously be designed as a separate unit that can be transported and connected temporarily to any reactor to be cleaned or may of course also be more or less permanently connected to one reactor system.

The main advantages consequently are that the solvent can be kept in a purer state throughout the cleaning process without having to use fresh solvent. The process consequently will be faster and much more economical in respect of the amount of solvent used in the process than the prior art procedures described above. In view of the small amount of contaminated solvent that eventually has to be disposed of, the environmental aspect is very well taken care of. The time needed for emptying and refilling the reactor vessel several times is also eliminated. Another advantage is the possibility of connecting several reactor systems to one filter unit, thus saving more time.

Figure 2:
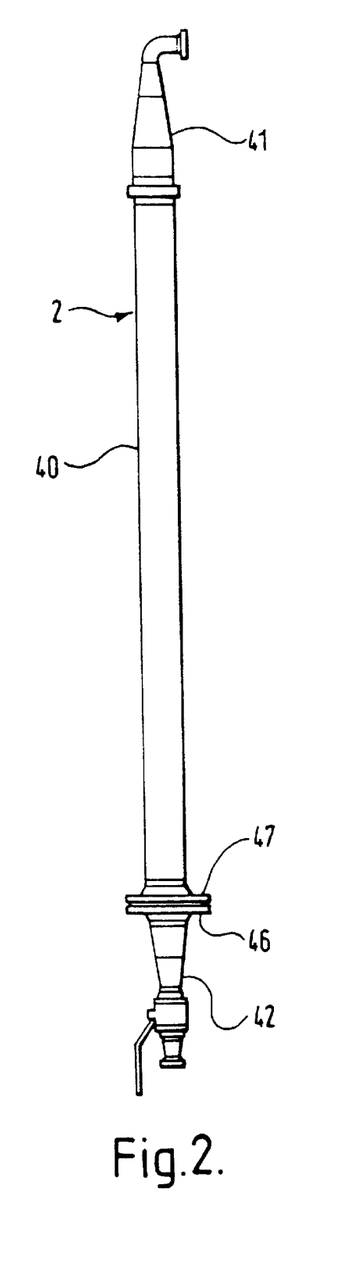
FIG. 2 illustrates a filter unit according to a preferred embodiment.

FIG. 2 illustrates a preferred embodiment of the filter unit 1 in an assembled state with a main housing 2 in the form of a tube 40, an upper end part 41 and a lower end part 42. The tube 40 is made of stainless steel and has a inner diameter of about 100 mm and an overall length of 1720 mm. The tube 40 in use is almost entirely filled with granulated active carbon of the kind described above.

A filter unit of this size is adapted to differently sized reactor systems of the kind used for chemical processes. The size of the filter unit and the amount of absorbent is decided by the total size of and the degree of contamination in the reactor system.

Figure 3:
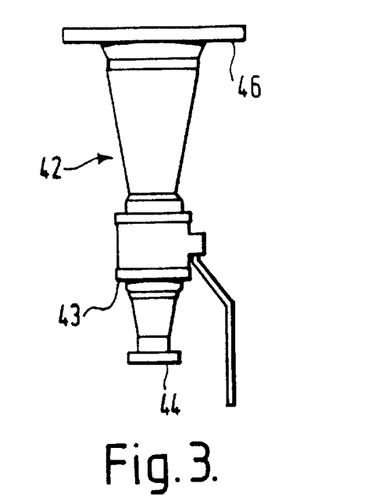
FIG. 3 illustrates the lower end part of the filter unit in FIG. 2.

The lower end part 42, which is provided with a ball valve 43 having a connection tube 44 for connection to the conduit from the pump 11, is provided with an upper, flat surface adapted to receive a backing plate for a filter net. The backing plate is made of stainless steel and has a thickness of 1.5 mm and is perforated by evenly distributed holes having a diameter of 5 mm. The area of the holes is 35% of the total effective area of the backing plate. The filter net, which has a mesh size of 0.077 mm is disposed upstream the backing plate. The lower end part is also provided with an attachment part 46 for attachment to a corresponding flange 47 on the tube 40.

Figure 4:
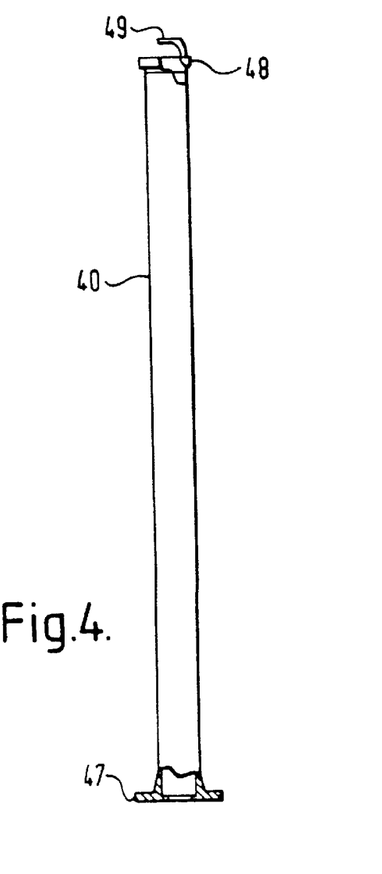
FIG. 4 shows the elongate medial section of the embodiment of the filter unit in FIG. 2.
Figure 5:
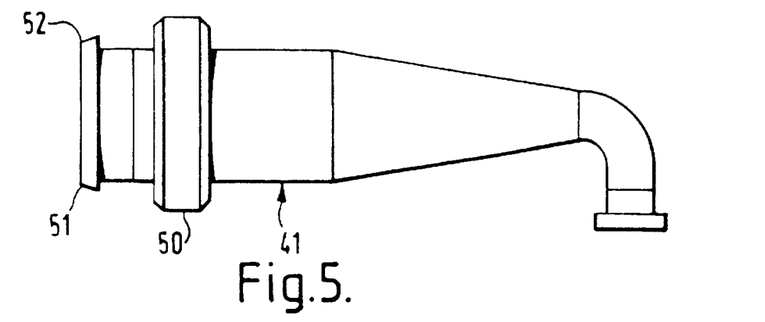
FIG. 5 illustrates the upper end part of the filter unit in FIG. 2.
Figure 6:
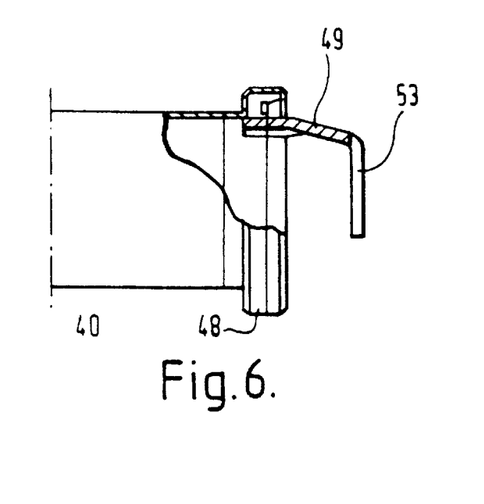
FIG. 6 shows the partly sectioned upper end part of the medial section in FIG. 4.
Figure 7:
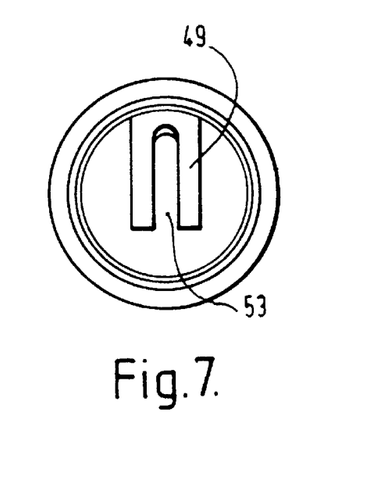
FIG. 7 is an end view of the upper end part in FIG. 6.

An overall view of the tube 40 is shown in FIG. 4. The upper end of the tube is provided with attachment threads 48 and a bracket 49 for holding the plunger 17.

Details of the upper end of the tube and upper end part are shown in FIGS. 5–8. The plunger 17, and consequently also the bracket 49, is to be housed in the upper end part 41. The part 41 is provided with an attachment nut 50 fitting onto the threads 48 on the tube 40. The lower end of the part 41 is provided with a flange 51 with a conically tapering surface 52 intended to fit a corresponding conically flaring surface in the upper end of the tube.

Figure 8:
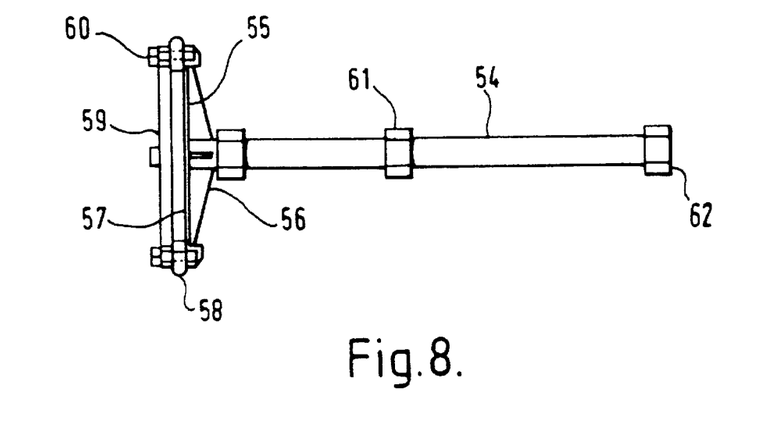
FIG. 8 is a plunger located in the upper end part of the filter unit in FIG. 2 for holding and compressing the active carbon in the unit.

The bracket 49, which is made of 6 mm stainless steel, is provided with a transversely oriented slit 53 intended to receive a 12 mm stainless steel bar 54 provided with an M12 thread along its entire length. The bar 54 is part of the plunger 17, which further comprises a 1.5 mm perforated backing plate 55 of stainless steel for a filter net 57. The backing plate is transversely oriented relative to the bar 54. The holes in the backing plate have a diameter of 5 mm and are evenly distributed over the plate. The area of the perforations is 35% of the effective flow area of the plate. The backing plate is strengthened by brackets 56.

The filter net 57, which has a mesh size of 0.077 mm, is held against the backing plate 55, together with a circumferential sealing ring 58 intended to engage the inner surface of the tube 40, by means of a holding ring 59 attached to the backing plate 55 by means of bolts 60.

The free end of the bar 54 is provided with a movable lock nut 62. Another movable nut 61 is located on the threads of the bar 54. When the plunger is to be mounted, the bar 54 is inserted into the transverse slit 53 in the bracket 49 with the backing plate 55 and the nut 61 located between bracket and tube.

When the nut 61 is screwed outwardly against the bracket 49, the plunger will move into the tube into engagement with the absorbent material in the tube. A specific torque at the tightening of the nut 61 will give a specific compressive force on the absorbent material. For the specific kind of active carbon granules defined above and with the specific dimensions of the tube given above, a torque of about 15 N.m has been found suitable to hold the granules securely and to prevent the formation of channels. When the specified torque has been set, the lock nut 62 is tightened against the bracket 49, thereby locking the nut 61 as well as the plunger.

The length of the bar 54 can be chosen to allow a variation in the amount of absorbent material in the tube in order to adapt the filter unit to differently sized reactor systems and/or different degrees of contamination.

It will be appreciated that a different orientation may be chosen so that one or more threaded bars are mounted on the tubular housing 40 and the slitted bracket is mounted on the plunger 17.

Details of an alternative plunger 17 and upper end of the tube 40 are shown in FIGS. 9–15. The plunger 17 is made of a number of components, namely a threaded stainless steel bar 54, a backing plate 55, a sealing ring 58, a filter net 57 and a bracket 49.

Figure 9:
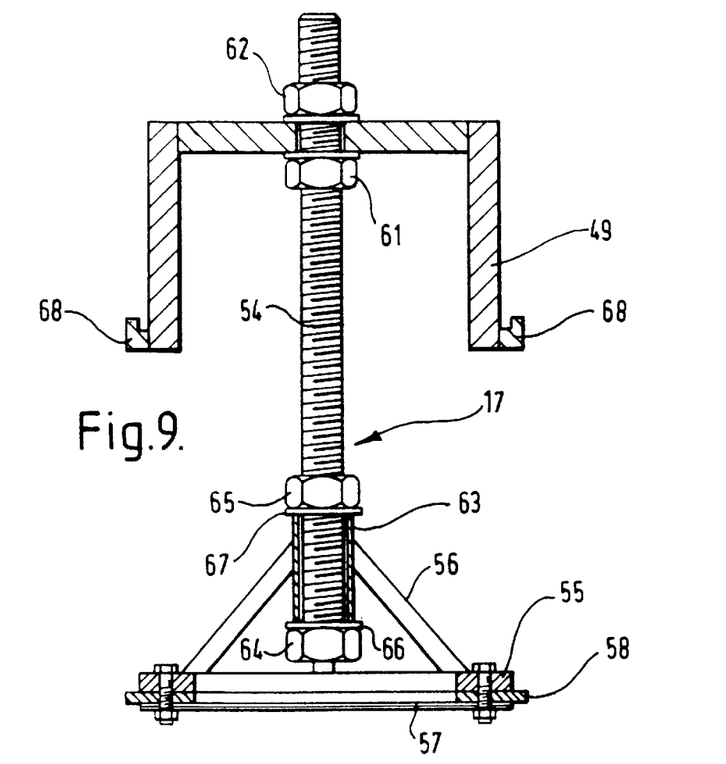
FIG. 9 is an alternative embodiment of such a plunger.
Figure 10:
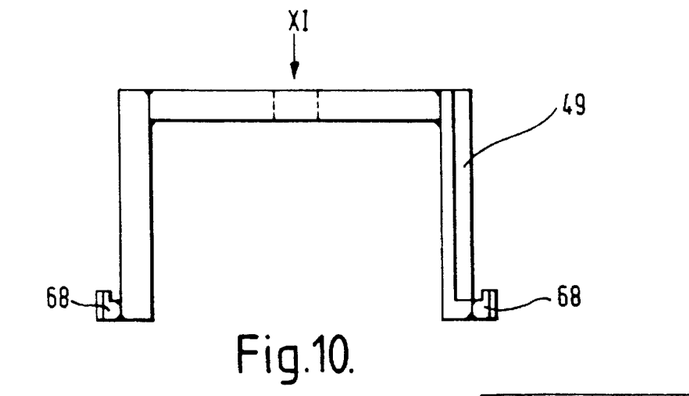
FIG. 10 shows the bracket from FIG. 8.
Figure 11:
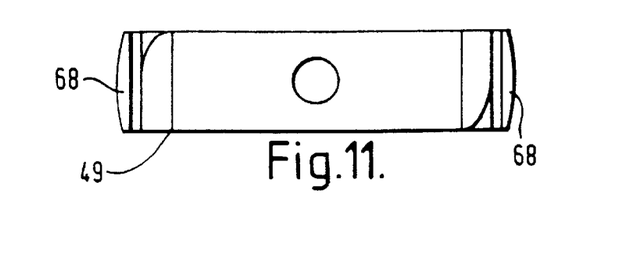
FIG. 11 shows a view of the bracket of FIG. 10 in the direction XI.
Figure 12:
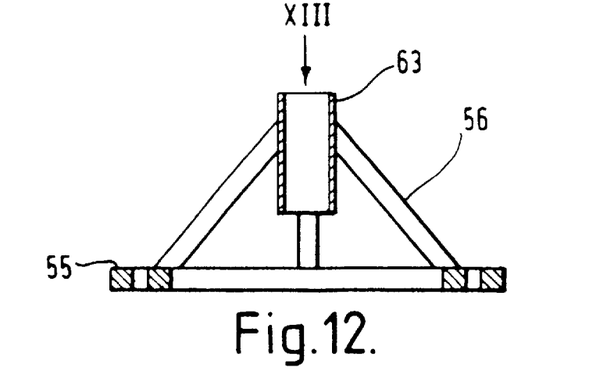
FIG. 12 shows the backing plate from FIG. 8.
Figure 13:
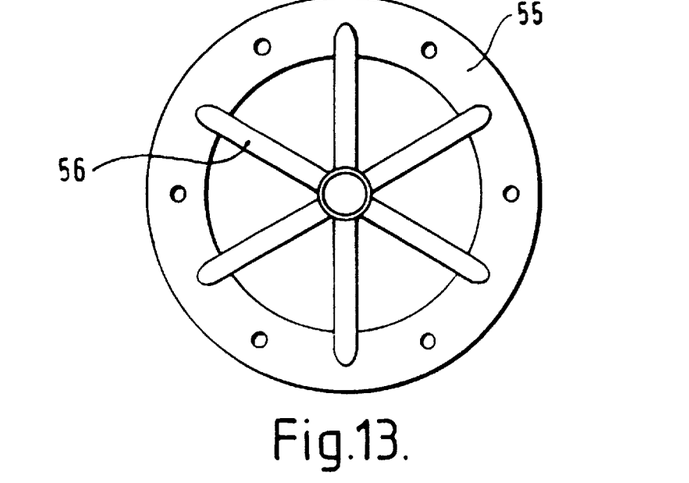
FIG. 13 shows a view of the backing plate of FIG. 12 in the direction XIII.

The backing plate 55 is annular in shape and is strengthened by a series of brackets 56 arranged in conical formation. The brackets terminate at a centrally positioned sleeve 63 The threaded stainless steel bar 54 passes through the sleeve 63 and is held permanently in place by two locking nuts 64 and 65. Between the sleeve 63 adjacent to the nuts are washers 66 and 67.

The annular part of the backing plate 55 is attached to the filter net 57, separated by the sealing ring 58. The sealing ring is a Teflon™ gasket, and the filter net is a perforated disc.

Figure 14:
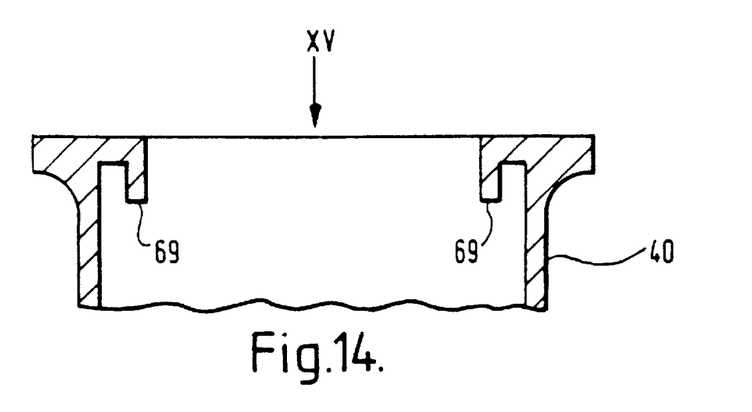
FIG. 14 shows in section the upper end of a tube in which the plunger of FIG. 9 may be inserted.
Figure 15:
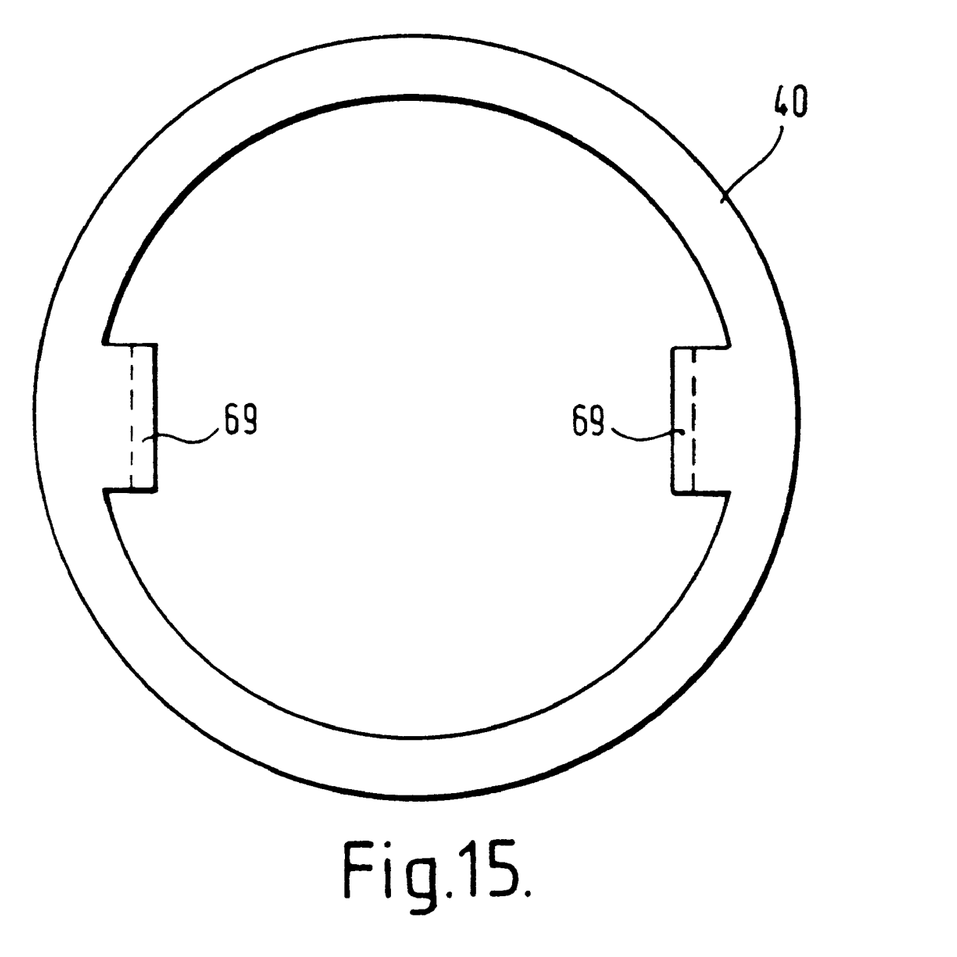
FIG. 15 shows a view of the tube of FIG. 14 in the direction XV.

The bracket 49 comprises a U-shaped steel member. Grooved flanges 68 are provided at the two extremities. These are adapted to engage with grooved ledges 69 in the inside of the upper end of the tube 40.

The plunger unit is put into position by engaging the grooved flanges 68 with the grooved ledges 69. This is achieved by first inserting the plunger 17 into the top of the tube 40 with the bracket 49 oriented away from the grooved ledges 69 in the tube, and then rotating it until the flanges and ledges are engaged.

The bracket 49 has a slit in the form of a centrally positioned hole and is again positioned between two movable lock nuts 61 and 62. The lower nut 61 is tightened with a torque key to obtain a specified torque. The upper nut 62 is then tightened until the bracket 49 is held firmly in place between the two lock nuts.

It is important to ensure that the absorbent material 3 is sufficiently compressed; otherwise it may move around, causing the relatively contaminated lower end to mix with the relatively clean upper end in use. This can be done by vibrating the column before applying the torque pressure. Ideally a sustainable torque would be applied after the device has been assembled, once no further compression is possible.

Once a particular cleaning process has finished, the plunger 17 may be removed and the absorbent material discarded if necessary. This eliminates the possibility of cross-contamination if it were re-used.

It should be emphasized that, as already mentioned above, all dimensions and sizes given above relate to one specific embodiment adapted to specific reactors, and that the dimensions and sizes may have to be adapted to fit other reactors and other types of containers and conduits that are to be cleaned.

What is claimed is:

1. A method of cleaning a reactor vessel for a chemical process comprising a container (30) and one or more conduits (32, 33, 36) associated with the container preparatory to the chemical process being carried out in the reactor vessel, the method comprising a cleaning solvent adding stage in which a volume of a cleaning solvent for contaminants contained in the reactor vessel is added to the reactor vessel and a cleaning solvent circulation stage in which the volume of cleaning solvent is circulated in the reactor vessel characterized in that during the cleaning solvent circulation stage at least a portion of the volume of the cleaning solvent is purified and recycled back into the reactor vessel by forcing the at least a portion of the volume of the cleaning solvent through a filter system (1, 4, 7, 9, 10, 11, 12, 13, 14, 15, 16, 17) having an inlet in fluid communication with the reactor vessel, an outlet in fluid communication with the reactor vessel and a flow path between the inlet and the outlet which contains an adsorbent (3) for the contaminants.

2. A method as claimed in claim 1, characterized in that the cleaning solvent circulation stage is carried out solely with the volume of cleaning solvent added in the cleaning solvent adding stage.

3. A method as claimed in claim 1 or 2, characterized in that the cleaning solvent is circulated around the reactor vessel in the cleaning solvent circulation stage by refluxing.

4. A method as claimed in claim 3, characterized in that the reactor vessel includes a cooling unit (31) for condensing and that the outlet of the filter system is in fluid communication with the cooling unit.

5. A method as claimed in claim 1, characterized in that the adsorbent is granulated active carbon.

6. A method as claimed in claim 1, characterized in that the filter system includes one or more particle filters (4, 7) upstream of the adsorbent.

\* \* \* \* \*